United States Patent
Farmer et al.

(10) Patent No.: US 7,706,975 B2
(45) Date of Patent: Apr. 27, 2010

(54) MOBILE CELLULAR IDENTIFICATION DATABASE FOR ENHANCED GPS PERFORMANCE

(75) Inventors: Dominic Gerard Farmer, Los Gatos, CA (US); Suzanne Arcens, Dusseldorf (DE)

(73) Assignee: Qualcomm Incorporated, San Diego, CA (US)

( * ) Notice: Subject to any disclaimer, the term of this patent is extended or adjusted under 35 U.S.C. 154(b) by 854 days.

(21) Appl. No.: 11/253,359

(22) Filed: Oct. 18, 2005

(65) Prior Publication Data

US 2006/0129317 A1    Jun. 15, 2006

(51) Int. Cl.
G01C 21/00    (2006.01)

(52) U.S. Cl. ............... 701/213; 701/200; 701/207; 342/352; 342/357.01; 342/357.09; 342/357.1; 342/450

(58) Field of Classification Search ............... 701/213, 701/207; 342/357.15
See application file for complete search history.

(56) References Cited

U.S. PATENT DOCUMENTS

| | | | | |
|---|---|---|---|---|
| 5,572,218 | A * | 11/1996 | Cohen et al. | 342/357.06 |
| 5,938,721 | A * | 8/1999 | Dussell et al. | 701/211 |
| 5,999,124 | A * | 12/1999 | Sheynblat | 342/357.09 |
| 6,052,597 | A * | 4/2000 | Ekstrom | 455/456.3 |
| 6,133,874 | A * | 10/2000 | Krasner | 342/357.15 |
| 6,188,351 | B1 * | 2/2001 | Bloebaum | 342/357.15 |
| 6,222,482 | B1 * | 4/2001 | Gueziec | 342/357.08 |
| RE37,256 | E * | 7/2001 | Cohen et al. | 342/357.06 |
| 6,288,676 | B1 * | 9/2001 | Maloney | 342/457 |
| 6,292,666 | B1 * | 9/2001 | Siddiqui et al. | 455/456.4 |
| 6,433,735 | B1 * | 8/2002 | Bloebaum et al. | 342/357.1 |

(Continued)

FOREIGN PATENT DOCUMENTS

WO    03058986    7/2003

(Continued)

OTHER PUBLICATIONS

International Search Report mailed on Feb. 24, 2006, by M. Perez, for International Application No. PCT/US2005/037511, filed on Oct. 19, 2005, by Qualcomm Incorporated (3 pages).

(Continued)

*Primary Examiner*—Khoi Tran
*Assistant Examiner*—Jonathan Sample
(74) *Attorney, Agent, or Firm*—Jimmy Cheng

(57) ABSTRACT

A mobile station database of cellular identifications and associated position information is stored in mobile station memory. The mobile station uses the position information in the database to assist in determining a current position for the mobile based on an identifier, such as cell ID, base station BSIC, PSC, or carrier frequency. A satellite vehicle signal is searched in an uncertainty region that is a function of position information associated with the current identifier. The uncertainty region can be limited by assumed platform dynamics via predefined velocity and acceleration information. Time maintenance for the mobile station can also be achieved through known approximate position from the position database and measurement of a single satellite vehicle propagation delay. The mobile station can compare a position determination obtained through satellite vehicle signals with position database information to determine the validity of that position. Out-of-network position information is also stored in the position database and is optionally shared with a network.

28 Claims, 7 Drawing Sheets

U.S. PATENT DOCUMENTS

| | | | |
|---|---|---|---|
| 6,496,776 B1* | 12/2002 | Blumberg et al. | 701/213 |
| 6,640,184 B1* | 10/2003 | Rabe | 701/207 |
| 6,757,545 B2* | 6/2004 | Nowak et al. | 455/456.2 |
| 6,791,472 B1* | 9/2004 | Hoffberg | 340/905 |
| 6,885,336 B2* | 4/2005 | Forrester | 342/357.1 |
| 6,937,872 B2* | 8/2005 | Krasner | 455/502 |
| 2002/0080063 A1 | 6/2002 | Bloebaum et al. | 342/357.1 |
| 2003/0069024 A1* | 4/2003 | Kennedy, Jr. | 455/456 |
| 2003/0214433 A1* | 11/2003 | Pietila et al. | 342/357.15 |
| 2004/0012519 A1* | 1/2004 | Durst et al. | 342/357.07 |
| 2004/0104841 A1* | 6/2004 | Syrjarinne | 342/357.13 |
| 2004/0132463 A1* | 7/2004 | Berg et al. | 455/456.1 |
| 2004/0160909 A1* | 8/2004 | Sheynblat | 370/328 |
| 2006/0052115 A1* | 3/2006 | Khushu | 455/456.3 |

FOREIGN PATENT DOCUMENTS

WO    WO 03058986 A2 *  7/2003

OTHER PUBLICATIONS

Written Opinion mailed on Feb. 24, 2006, by M. Perez, for International Application No. PCT/US2005/037511, filed on Oct. 19, 2005, by Qualcomm Incorporated (6 pages).

* cited by examiner

MOBILE CELLULAR IDENTIFICATION DATABASE FOR ENHANCED GPS PERFORMANCE

BACKGROUND

1. Technical Field

The present method and apparatus relates generally to positioning systems for wireless user equipment, and more specifically to a mobile station database of cellular identifications and associated position information for assisted position determination.

2. Background

Accurate position information of user equipment (UE) such as cellular telephones, personal communication system (PCS) devices, and other mobile stations (MSs) is becoming prevalent in the communications industry. The Global Positioning System (GPS) offers an approach to providing wireless UE position determination. GPS employs satellite vehicles (SVs) in orbit around the earth. A GPS user can derive precise navigation information including three-dimensional position, velocity and time of day through information gained from the SVs.

GPS systems determine position based on the measurement of the times of arrival at a GPS receiver antenna of the GPS signals broadcast from the orbiting SVs. Normally, reception of signals from four SVs is required for precise position determination in four dimensions (latitude, longitude, altitude, and time). The observed signal propagation delay is the difference between the observed signal transmit time and the assumed local receive time. A pseudorange is constructed by scaling the observed propagation delay by the speed of light. The location and time are found by solving a set of four equations with four unknowns incorporating the measured pseudoranges and the known locations of the SVs. The precise capabilities of the GPS system are maintained using on-board atomic clocks for each SV, in conjunction with tracking stations that continuously monitor and correct SV clock and orbit parameters.

One disadvantage of the GPS system for location determination is the relatively long time needed to perform signal acquisition under certain conditions. SV signals cannot be tracked until they have first been located by searching in a two-dimensional search "space", whose dimensions are code-phase delay and observed Doppler frequency shift. Typically, if there is no prior knowledge of a signal's location within this search space, as would be the case after a receiver "cold start", a large number of code delays and frequencies must be searched for each SV signal that is to be acquired and tracked. These locations are examined sequentially, a process that can take several minutes in a conventional GPS receiver.

GPS receivers must acquire signals from SVs whenever the receiver has lost reception, such as, after power down, or when the signal has been blocked from the receiver for some period of time. After acquiring the signals, they may be maintained or "tracked." Assuming a fixed sensitivity threshold, the time spent acquiring the SV signals is proportional to the total search space that is derived from the product of time and frequency uncertainty. For applications that desire high sensitivity, the signal re-acquisition delay may take tens of seconds if the search space is large.

In order to reduce this delay, information may be provided to aid a GPS receiver in acquiring a particular signal. Such assistance information permits a receiver to narrow the search space that must be searched in order to locate a signal, by providing bounds on the code and frequency dimensions. The predicted code window provides a reduced range within which the "code phase" (effectively, the signal time of arrival, or "pseudorange") should be found, or a predicted range of observed Doppler shift associated with the signal. Assistance may also include other information about the signal, such as its PN (pseudo-noise or pseudo-random) code, data bit modulation, and content. Narrower code and frequency windows reduce the overall search space resulting in a reduction in the time in which the receiver takes to acquire the signal. A system that employs a GPS receiver augmented with externally sourced GPS assistance data is commonly referred to as an "assisted global positioning system" (AGPS).

One example of an AGPS system is a wireless mobile station (MS) with GPS capabilities in communication with one or more base stations (BSs), also referred to as base transmitting stations (BTSs) or node Bs, which in turn communicate with one or more servers, also called Position Determination Entities (PDEs) or Serving Mobile Location Centers (SMLCs) depending upon the communication air interface protocol. The PDE derives GPS assistance information from one or more GPS reference receivers. The PDE also has access to a means of determining the approximate MS position. This might consist of a "base station almanac" (BSA) that provides BTS/node B location based upon serving cell identification (ID) reported by the MS. Alternatively, this may be derived via a AnyTime Interrogation (ATI) request to the "home location registry" (HLR) associated with the MS. The PDE computes the assistance information customized for the approximate MS position. The BSA provides the approximate location of the MS based upon the serving cell identification provided to the PDE by the MS. The BSA provides the geographical coordinates for a reference position. The PDE also maintains a GPS database that contains reference time, satellite orbit almanac and ephemeris information, ionosphere information, and satellite working condition ("health") information.

The goal of such GPS assistance information is to permit the MS to predict the time of arrival, or code phase, of a particular SV signal, and the Doppler shift of the SV signal. If the MS is provided with an initial reference position that is within an area of predefined size, such as a particular cellular coverage, then the total search space can be reduced to that consistent with the predefined size. Reducing search space size allows the receiver to spend more time processing each code and frequency hypothesis resulting in improved overall sensitivity. Sensitivity improvements in excess of 20 dB can be obtained by using reduced search space.

However, assisted position location systems depend upon communication with an external entity. Such communication suffers from connection and messaging latency, consumes additional power and consumes additional communication system bandwidth that impacts the overall capacity.

Position determination thus requires frequent updates of either or both orbital data or acquisition assistance for satellite signal acquisition. A need exists for a system and method that improves the performance and accuracy of position determination with diminishing dependence upon frequent updates of orbital data or satellite signal acquisition assistance.

SUMMARY

The method herein for determining position of a mobile station includes storing a database of cellular identifications and associated position information in mobile station memory. The mobile station uses the position database to assist in mobile station position determination. The database consists of one or more cell identifiers and position information associated with the identifier. The identifiers may consist of one or more cellular identifications, such as cell ID, base station identity code (BSIC), primary scrambling code (PSC), and base station carrier frequency. Satellite vehicle signals are searched in an uncertainty region that is a function of the position information stored in the database. The size of the position uncertainty region is either based upon position information, is of a predefined size, or is based upon propagation of a predefined size that is grown using assumed platform dynamics.

Platform dynamics using predefined host platform velocity and acceleration information limits the size of the uncertainty region. A satellite vehicle signal is searched in the smaller region ($R_0$) of an uncertainty region based upon position information stored in the database, an uncertainty region of predefined size, and an uncertainty region based upon platform dynamics for an initial position ($x_0$, $y_0$).

If a precise or approximate position is known at a later position ($x_1$, $y_1$), then the mobile station selects the smaller region ($R_1$) of an uncertainty region based upon position information stored in the database, an uncertainty region of predefined size, and an uncertainty region based upon platform dynamics for the later position ($x_1$, $y_1$). Searching begins in the area of overlap of ($R_0$) and ($R_1$) for this later position.

The position database is maintained by updating position information associated with a cell identifier as this information is obtained. Previous position information and current position information are used to recalculate an approximate position associated with a cell identifier.

The position information in the position database provides mobile station time maintenance and sanity checks on position determinations as well. An "out-of-network" position database can be constructed by the network by associating position fix reports with the serving base station cell identifier The "out-of-network" database can optionally be transferred to another network.

The mobile station herein includes a two-way communication system, a position location system, mobile station control, and the position database in mobile station memory. The position location system, mobile control, and memory communicate such that a satellite vehicle signal is searched based upon position information in the position database.

DRAWINGS

Embodiments of the disclosed method and apparatus are shown in the following figures, in which like reference numbers and designations indicate like or similar parts.

FIG. 5b illustrates a continuation of the outline of FIG. 5a.

DETAILED DESCRIPTION

The method and apparatus described herein is applicable for communication systems, such as wireless position location systems that acquire and utilize global positioning system satellite vehicle signals as well as those that use acquisition assistance data, such as AGPS systems. It will be understood by those skilled in the art that the system and method herein may be employed in any communication air interface protocol, such as but not limited to, UMTS, GSM, and code division multiple access (CDMA).

Figure 1A:
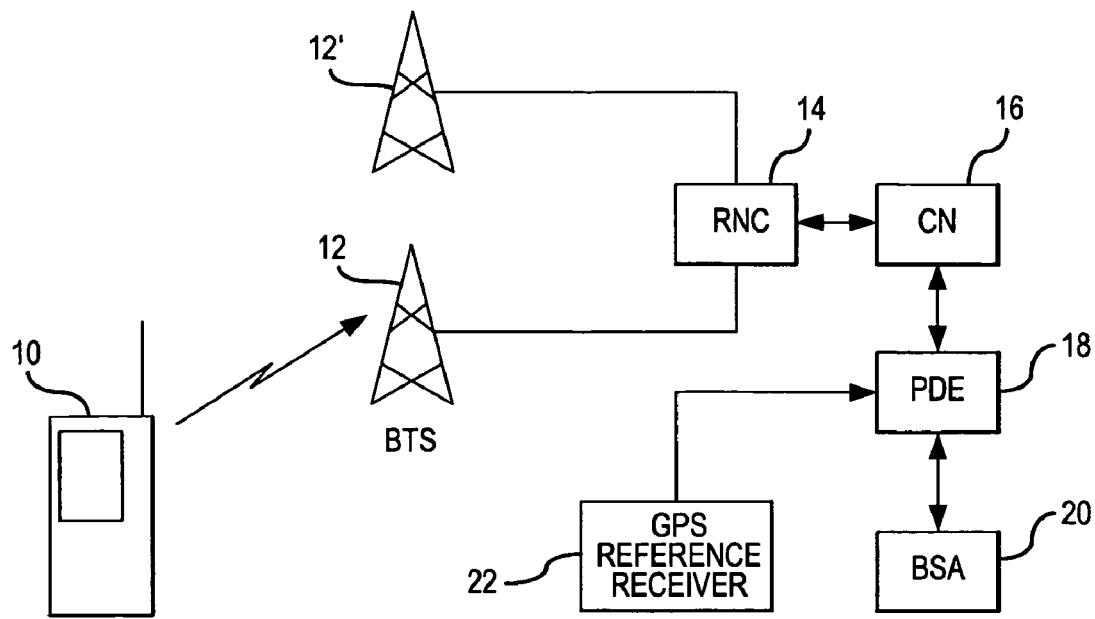
FIG. 1A illustrates an overview of communication amongst a mobile station, base station, radio network controller, core network, and position determination entity.
Figure 1B:
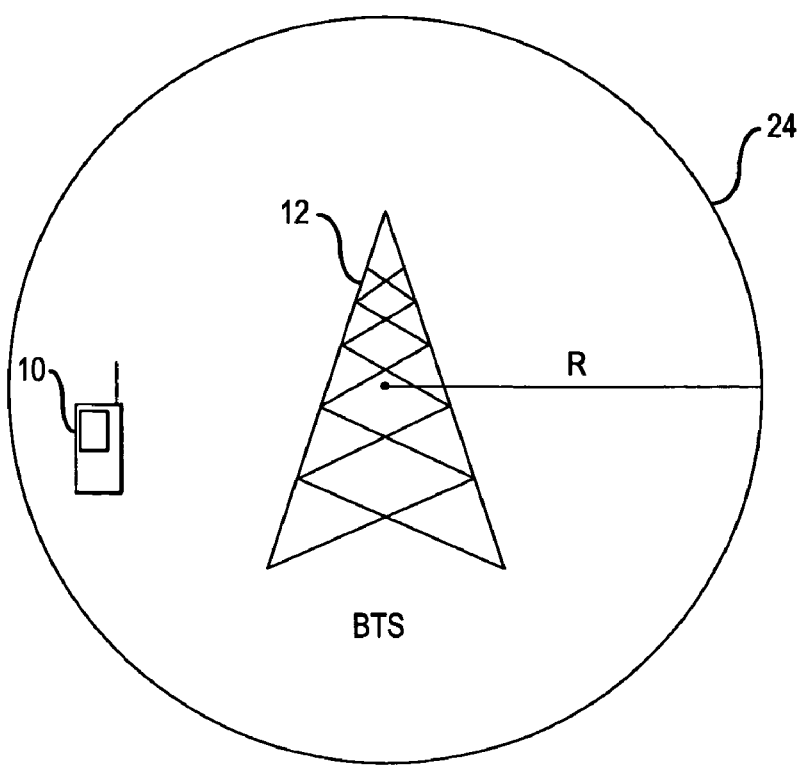
FIG. 1B illustrates the approximate coverage area for a base station of FIG. 1A.

With reference to FIGS. 1A and 1B, diagrams illustrate an example of an MS 10 with GPS capabilities communicating with a serving base station 12, also known as a base transmitting station (BTS) in GSM protocol or a "node B" in UMTS protocol. The term "mobile station" is used herein to describe any type of equipment with position location capability and is not to be limited to any particular type of hardware. The MS 10 is communicating with the BTS 12 because MS 10 is located in the coverage area of the BTS 12. If the serving antenna of the BTS 12 operates directly from this base station, (for example, there is no repeater in the communication path) then an appropriate first estimation of the coverage area 24 of BTS 12 is a circle of radius R centered at the serving antenna of BTS 12 as shown in FIG. 1B. Thus, the uncertainty of the location of MS 10 lies within this coverage area 24, also referred to as the "uncertainty region." (It will be apparent to those skilled in the art that the coverage area is not necessarily circular, but is more realistically a sector shape.)

Base stations 12 communicate with a radio network controller (RNC) 14, which in turn communicates with a core network (CN) 16. A position server, or position determination entity (PDE), 18 communicates with the core network to provide position determination assistance to a mobile station. The PDE 18 stores a base station almanac (BSA) 20 which stores reference positions for a mobile station and in the case of the CDMA air interface, time delay calibration estimates. The PDE also maintains a local database of satellite orbit almanac, clock and ephemeris information, ionosphere information, and satellite working condition ("health") information. Some of this information is customized for the approximate location of the MS; this is determined by the BSA using the mobile's cellular identification. A GPS reference receiver, or world area reference network (WARN), 22 provides reference SV information to the PDE 18.

Figure 2:
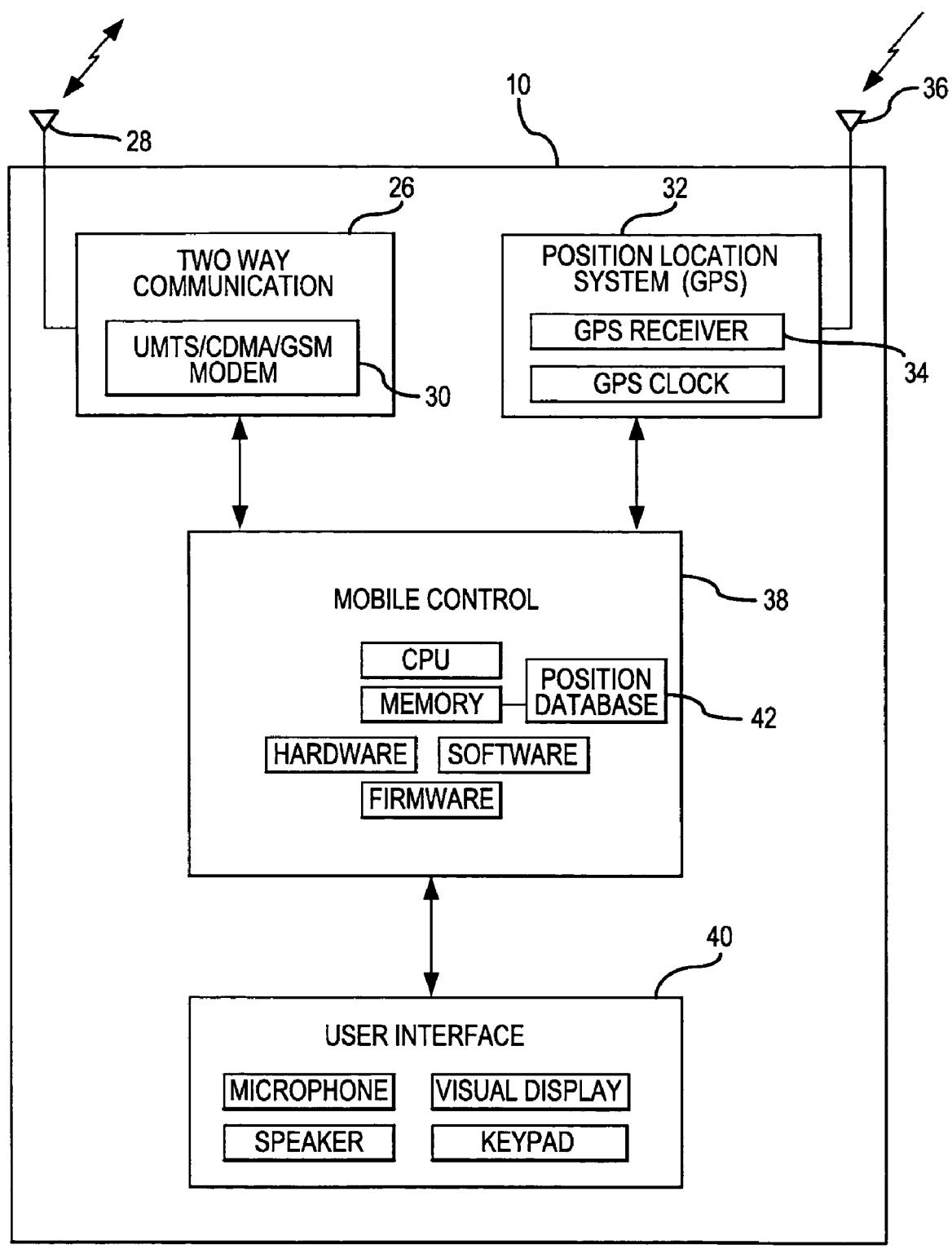
FIG. 2 illustrates an example mobile station with position location capabilities.

Referring to FIG. 2, a diagram illustrates components of the MS 10 depicted in FIGS. 1A and 1B. The mobile station 10 includes a two-way communication system 26, such as but not limited to a cellular communication system, which transmits and receives signals via antenna 28. The communication system includes modem 30, such as a UMTS, CDMA, or GSM modem. Mobile station 10 includes a position location system, such as a Global Positioning System 32 having a GPS receiver 34 that receives SV signals via antenna 36. The modem 30 and GPS receiver 34 communicate with one another, and the MS cellular identification, frequency, and other radio information is shared between the two. Mobile control 38 is provided by a central processing unit (CPU) and associated memory, hardware, software, and firmware. It will be understood as used herein that the CPU can, but need not necessarily include, one or more microprocessors, embedded processors, controllers, application specific integrated circuits (ASICs), digital signal processors (DSPs), and the like. The term CPU is intended to describe the functions implemented by the system rather than specific hardware. The user interface 40 allows a user to enter information into and receive information from MS 10. As used herein the term "memory" refers to any type of long term, short term, or other memory associated with the MS, and is not to be limited to any particular type of memory or number of memories, or type of media upon which memory is stored.

Before an MS 10 obtains its position, either through ephemeris data or acquisition assistance, the only relevant data that the MS possesses is its MS cellular identification, hereafter "cell ID". Each BTS in the world in GSM, UMTS, and GPRS protocols has a unique cell ID. Standard 3GPP TS 23.003 defines the "Cell Global Identity" as consisting of the three-digit MCC+ the two or three digit MNC+two byte LAC+2 byte CI, where MCC refers to mobile country code, MNC refers to mobile network code, LAC refers to location area code, and CI refers to cell identity. Although the definition of "Cell Global Identity" is currently in use and serves the purpose of the "cell ID" referred to herein, it will be apparent to those of skill in the art that a "cell ID" need not be defined in precisely the manner of the 3GPP TS standard; an endless variety of components could make up a unique cell ID and still function in the same way to produce the same result as that described in the present method and apparatus. As used herein, the terms "cellular identifications" or "cellular identification" in general refers to not only "cell ID", but other identifications as well, including but not limited to, base station identity codes (BSICs), primary scrambling codes (PSCs), and base station carrier frequencies.

The network may obtain the cell ID by submitting an any time interrogation (ATI) to the home location register (HLR). The request can contain the international mobile equipment identity (IMSI) or mobile station integrated services digital network (MSISDN) identification. Additionally, the cell ID is extracted by the MS from periodically broadcast system information messages. Associating the cell ID with an approximate position represents the most basic way of describing the general location of an MS. It requires the network to identify the BTS with which the MS is in communication and the location of that BTS. Once the location of the BTS is known, then the approximate location of the MS is known to be somewhere within the coverage area of that BTS, or the uncertainty region. (See FIG. 1B.) The accuracy of this method of determining the approximate MS position depends of course on the cell size, or coverage area, and can be poor in many cases because the typical GSM cell, for example, ranges between two kilometers and thirty two kilometers in radius. Thus, not only is the precise location of the MS within a particular coverage area unknown, but the radius of one coverage area is also unlikely to be the same as that of another.

During handoffs the MS does not necessarily retrieve the cell ID of subsequent base stations, but instead retains the cell ID of the base station to which the MS connected during power-up. For more rapid identification purposes, when an MS is handed off to a subsequent base station, the smaller, locally-unambiguous BSIC identifier—in GSM protocol, or PSC identifier—in UMTS protocol, along with the carrier frequency is accessed by the MS. However, while the cell ID is unique to each base station, the BSIC and PSC identifiers are not unique to each base station but are instead reused by other base stations elsewhere in the world.

Most mobiles spend a significant amount of time in a given geographical region. For example, a GPS system installed in an automobile or the cellular telephone of a user of that same automobile typically travels within a confined perimeter, e.g. the San Francisco Bay Area. The method and apparatus described herein for mobile-assisted position determination utilizes the fact that most mobile stations spend the majority of operating time in a particular geographical region. The method and apparatus herein includes a position database of cell identifiers and associated position information.

Each time a MS requests a position determination, either through UE Based or UE Assisted GPS, or by other means, various cellular identifications, including but not limited to, the cell ID, latitude and longitude, PSC or BSIC, and base station carrier frequency associated with the final, precisely determined position are stored in a database 42 (see FIG. 2). (The term "precise" position as used herein refers to the final position as determined through the use of a positioning system, such as but not limited to GPS). The position database 42 is stored and maintained in memory associated with the mobile station. The MS thus "learns" the relationship between cellular identifications such as cell ID, latitude and longitude, PSC or BSIC, and carrier frequency within the region it travels at each time (t) that the MS determines its position. An example of sample positions determined at different times (t) are shown in Table I, where $f_C$ refers to base station carrier frequency.

TABLE I

| Time | Cell ID | Precise Latitude ($P_{lat}$) | Precise Longitude($P_{lon}$) | PSC/BSIC | $f_c$ |
|---|---|---|---|---|---|
| $t_1$ | x | 65.78 degrees | −90.88 degrees | a | 10 MHz |
| $t_2$ | x | 65.79 degrees | −90.90 degrees | a | 10 MHz |
| $t_3$ | x | 65.80 degrees | −90.89 degrees | a | 10 MHz |
| $t_4$ | x | 65.78 degrees | −90.87 degrees | a | 10 MHz |
| $t_5$ | y | 65.88 degrees | −91.93 degrees | b | 15 MHz |
| $t_6$ | z | 65.24 degrees | −92.13 degrees | c | 20 MHz |

As the position database is built, the coverage area 24 (FIG. 1B), or uncertainty region of MS location, for any particular cell ID is more accurately defined. The more often that a position is requested in association with a particular cell ID and stored, e.g. cell ID x in Table I, the more accurate the geographical perimeter of the uncertainty region becomes.

It will be appreciated by those of skill in the art that a variety of algorithms or formulas can be applied to determine an approximate position (AP) based upon precise positions (P) associated with a cell ID determined at different times (t), given the sample data stored in the position database, where:

$$AP = f(P_{t_1}, P_{t_2}, P_{t_3}, \ldots) \quad (1)$$

For example, an approximate latitude and longitude associated with a particular cell ID may be determined by averaging all of the sample latitudes and longitudes found in association with the cell ID, or by taking a weighted average of the sample latitudes and longitudes, weighted by the uncertainty region associated with the measurement. The manner of arriving at an approximate latitude and longitude for each cell ID is not limited to any one methodology.

Once an approximate position associated with a particular cell ID is determined, it is stored by cell ID, an example of which is depicted in Table II.

TABLE II

| Cell ID | Approx. Lat. ($AP_{lat}$) | Approx. Long. ($AP_{lon}$) | PSC/BSIC | $f_c$ |
|---|---|---|---|---|
| x | 65.788 degrees | −90.885 degrees | a | 10 MHz |
| y | 65.88 degrees | −91.93 degrees | b | 15 MHz |
| z | 65.24 degrees | −92.13 degrees | c | 20 MHz |

Figure 3:
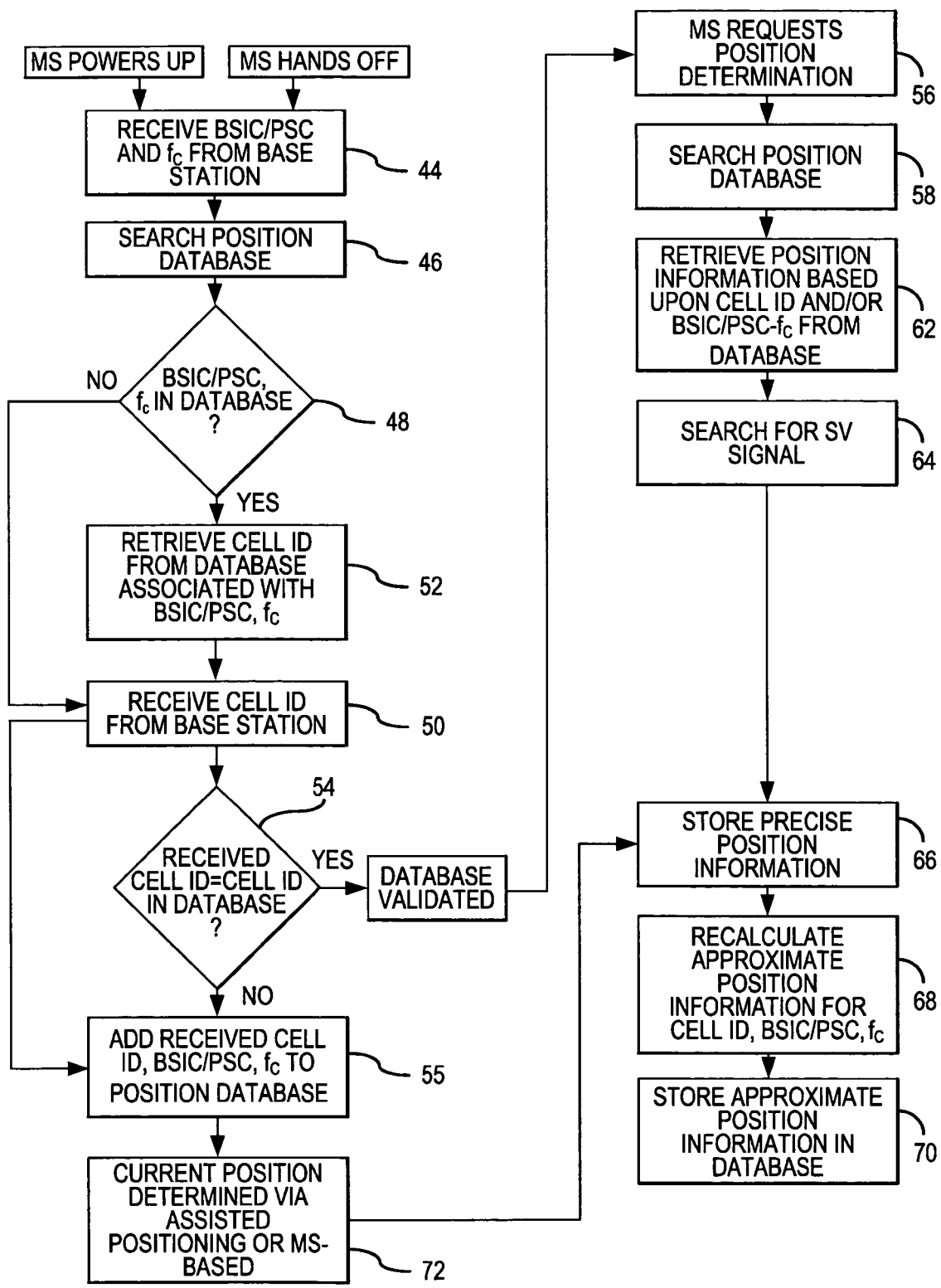
FIG. 3 illustrates an outline for a method of building and maintaining the mobile station position database.

This approximate position is then used by the MS to begin searching for the SV signal. It will be appreciated by those of skill in the art that the information stored in the position database 42 need not be in the form or format shown in Tables I and II, but can be stored in any manner that is relevant or useful to the system and method described herein. The sampled position data, such as illustrated in Table I, approximate position data, such as illustrated in Table II, and any other data necessary to arrive at an approximate position are herein referred to in combination as the position database 42. Thus the position database 42 includes one or more cell identifiers: cell identification, BSIC, PSC, and/or carrier frequency, and associated position information. The database is maintained based upon updated mobile station position information gained each time the mobile station determines position. Both previous and current position information is used to continually maintain the database. FIG. 3 outlines the process of building and maintaining the position database 42.

Referring to FIG. 3, whenever the MS powers up, is handed off, or encounters some form of reselection event, the MS receives the BSIC/PSC identifier and carrier frequency of the current base station 44. The MS searches the position database 42 for the BSIC/PSC identifier and carrier frequency 46 to determine if they have yet been initialized within the database 48. If not, the MS will encounter an "uninitialized" state for these identifiers, meaning the MS has not yet associated this particular base station with a meaningful location (either absolute or relative), and in which case the MS monitors the broadcast information to extract the relevant cell ID information. It should be noted that the locally unambiguous cell information (carrier frequency, BCIC/PSC) are established as a function of acquiring the BTS broadcast channel. The cell ID, BSIC/PSC and frequency are then included into the database 55. A position associated with these identifiers can be retrieved from the database the next time that the MS requires position associated with these identifiers through either UE Assisted or UE Based modes of operation or any other positioning method. 72. If the BSIC/PSC identifier and carrier frequency are in the database 48, then the cell ID associated with that BSIC/PSC identifier and carrier frequency is retrieved 52 from the database.

As mentioned earlier, the locally unambiguous channel selection parameters (frequency/BSIC/PSC) will need to be validated using the globally unambiguous Cell ID. This process is typically performed after a loss of network lock or power cycle. Once the base station sends its cell ID 50, the MS compares the cell ID located in the database with the cell ID received from the base station 54 to ensure that the BSIC/PSC identifier and carrier frequency are that of a known base station with which the MS communicated at an earlier time, rather than that of a base station elsewhere in the world that was not been previously encountered when determining position. If the cell ID received from the current base station matches that in the position database associated with the current BSIC/PSC identifier and carrier frequency, then the position database is validated for that particular cell ID-BSIC/PSC-frequency combination, as well as for the cell ID-BSIC/PSC-frequency combinations stored in the position database that are in geographical proximity to that cell ID. Because the cell ID-BSIC/PSC-frequency combinations in geographical proximity to the current cell ID are validated, the MS need not confirm the cell ID associated with a particular BSIC/PSC-frequency received during subsequent handoffs during the same session. Position can be determined from the position database after each handoff as outlined at 62 through 70 of FIG. 3 as described below.

If the cell ID received from the current base station does not match that in the database, then the database must be updated to include the current BSIC/PSC identifier, carrier frequency, and current cell ID received from the base station 55. This circumstance indicates to the MS that it is in a geographical location never before encountered when determining position, and likely some distance from the region typically traversed. Position information associated with the current cell ID, BSIC/PSC and frequency is stored once a position request is made at this cell ID via UE Based GPS, UE Assisted GPS or any other positioning method 72.

When the MS requests a position determination 56, it accesses the position database 58. The database is searched for the current cell ID—or BSIC/PSC and frequency if they are appropriately validated for the particular region in which the MS is traveling. If the database includes the current cell ID, or BSIC/PSC and frequency, then the approximate position information is obtained for that cell ID 62.

Provided this approximate position information, the MS searches for the SV signals using localized frequency and code phase search windows 64 in an uncertainty region that is a function of the position information stored in the database. The MS stores the precise position information along with the current cell ID, BSIC/PSC and frequency 66 (such as that shown in Table I). Then the approximate position associated with that cell ID, BSIC/PSC and frequency is recalculated 68 taking into account this latest "sample" precise position. Once this revised approximate position is calculated, the position database is updated 70 (such as shown in Table II). This methodology is performed by a suitable routine or routines operating in mobile control 38 (FIG. 2) or in communication with the mobile station.

The position information provided by the position database 42 thereby reduces the amount of search uncertainty associated with acquisition of an SV signal. By building and maintaining this MS position database 42 (FIG. 2), the MS also improves other MS performance criteria such as time maintenance, sensitivity, response time, and MS "keep-warm" operation. If position uncertainty is reduced, then the MS can afford to spend an increased amount of time searching for the SV signal at each point within the uncertainty region, which enables the MS to acquire the signal at a reduced signal-to-noise ratio. A reduced uncertainty region also improves response time taken to acquire the signal. Keep-warm operation refers to the ability of a receiver to locally maintain a copy of location and time for position and time maintenance. Use of the position database 42 further reduces dependence upon the need to perform periodic position sessions to maintain an approximate position estimate with reduced uncertainty. UE Based GPS, UE Assisted GPS or any other positioning method.

Figure 4A:
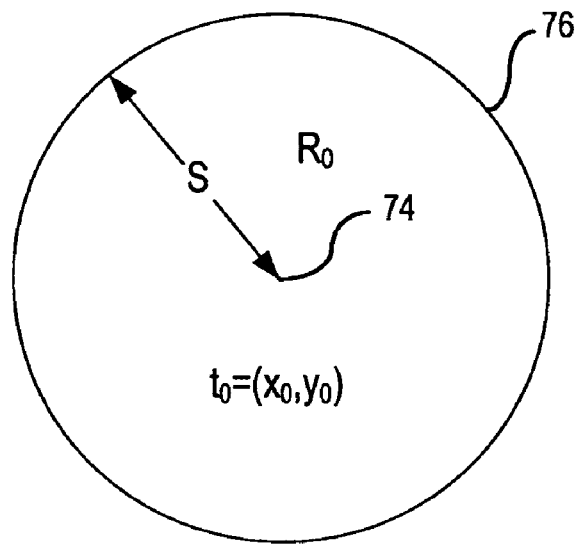
FIG. 4a illustrates a region of uncertainty around an initial position based on platform dynamics.

Handoffs or reselection events can be used to limit position uncertainty growth even without current position information. Typically position region uncertainty grows as a function of time and assumed platform dynamics:

$$s = ut + \tfrac{1}{2}at^2, \qquad (2)$$

where u is velocity, a is acceleration, t is time, and s is the radius of growth about an initial position. Turning to FIG. 4a, if a precise position $(x_0, y_0)$ is known for a particular cell ID that the MS accessed at a particular time $(t_0)$ 74, then as the MS travels, an uncertainty region 76 at time $(t_1)$ can be determined by extrapolating from the last known position, $(t_0)$, using assumed platform dynamics. An SV signal can be searched within this region 76. By programming an MS, for example, a GPS system installed in a particular platform, with velocity and acceleration information specific to that platform, this information can be used to calculate position uncertainty growth. For example, the MS could calculate uncertainty region growth based on maximum velocity and maximum acceleration of the platform, or upon a "typical" predefined velocity and acceleration. The method of calculating uncertainty region growth is not limited to any particular velocity or acceleration.

Figure 4B:
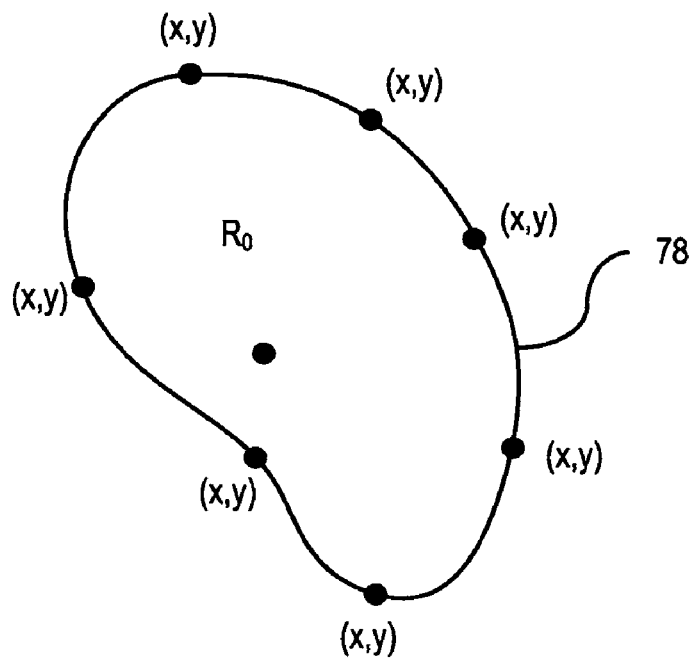
FIG. 4b illustrates a region of uncertainty around an initial position based on information from the mobile station position database.
Figure 4C:
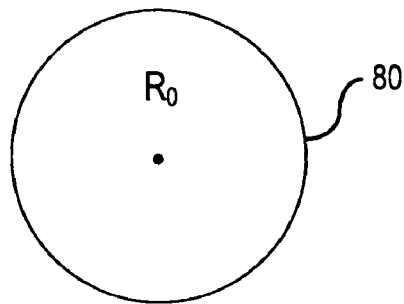
FIG. 4c illustrates a region of uncertainty of a predefined size around an initial position.

Alternatively, the MS position database 42 provides an uncertainty region within which to search based on cell ID, or BSIC/PSC and frequency information (e.g., Table I). The uncertainty region can be a function of position information in the position database 42. Referring to FIG. 4b, an uncertainty region 78 is defined by the perimeter of position points for a particular cell ID or BSIC/PSC-frequency. Alternatively, uncertainty region 78 is based upon position information associated with the cell ID or BSIC/PSC-frequency in some manner, such as by performing a mathematical operation on the data. However, if cell size information is extremely limited in the position database for a particular cell ID or BSIC/PSC-frequency, such as when there is only one or very few precise positions recorded for a particular cell ID, then the uncertainty region can be of a predefined area 80 for that cell ID or BSIC/PSC-frequency as shown in FIG. 4c. The region of uncertainty is considered unknown for a particular cell ID when less than a predefined number of precise positions have been recorded in association with that cell ID, or by any other means known to those of skill in the art.

Both platform dynamics and position uncertainty gained from the position database 42 provide information about the size and location of the uncertainty region. If either the position database provides an approximate position at a particular time $(t_0)$, or a precise position is known at time $(t_0)$, then an uncertainty region grows around the approximate or precise position based on equation (2) and is thus limited at a later point in time $(t_1)$. SV signals can initially be searched within the uncertainty region of smaller area: either the uncertainty region as bounded by equation (2) 76, or the uncertainty region gained from the position database 78 or 80.

Figure 4D:
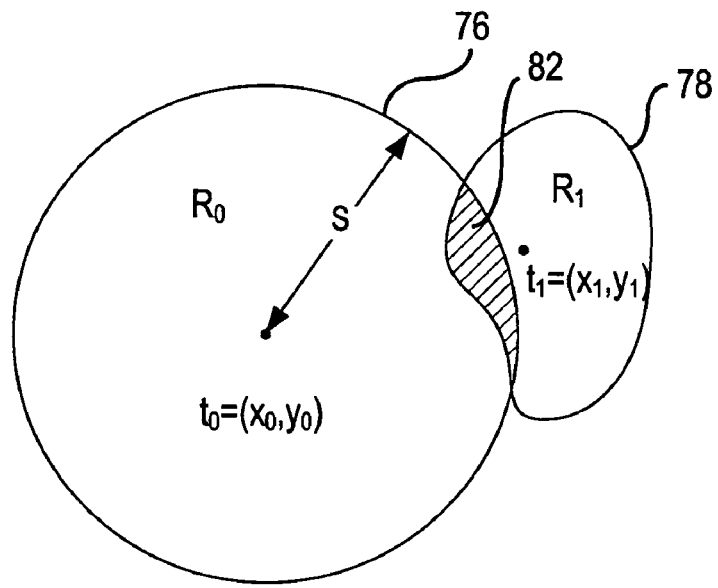
FIG. 4d illustrates the determination of an uncertainty region based upon platform dynamics and the mobile station position database.

Further, if approximate position is also known at time $(t_1)$ from the position database, then the uncertainty region is further bounded by the area of overlap as shown in FIG. 4d. With reference to FIG. 4d, a diagram illustrates the determination of an uncertainty region based upon platform dynamics and the position database. If precise or approximate position is known at time $t_0 = (x_0, y_0)$, then the uncertainty region bounded by platform dynamics is the area within circle 76. Further, if at time $(t_1)$ the position database provides an approximate position $(x_1, y_1)$ 77 and associated uncertainty region 78 (see also FIG. 4b), then the uncertainty region is likely within the area of overlap 82 of regions 76 and 78. The search for the SV signal begins in the area of overlap 82 as that is the region where the SV signal is most likely found.

The possibilities for bounding the uncertainty region based upon platform dynamics and the position database are vast. Either platform dynamics, the position database, or both can be used to bound the uncertainty region as the MS travels.

Figure 4E:
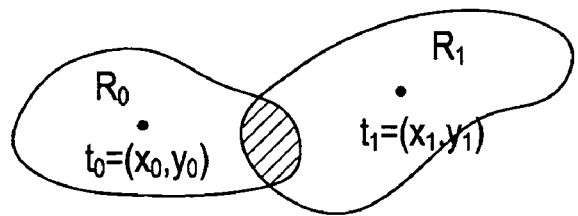
FIG. 4e illustrates the determination of an uncertainty region based upon information from the mobile station position database.

One last example is shown in FIG. 4e, which illustrates an MS traveling from an initial approximate position at time $t_0 = (x_0, y_0)$, to a second approximate position at time $t_1 = (x_1, y_1)$—both known from the position database. If an uncertainty region is known for both positions from the position database, then searching at time $(t_1)$ begins in the area of overlap of the two uncertainty regions.

Figure 5A:
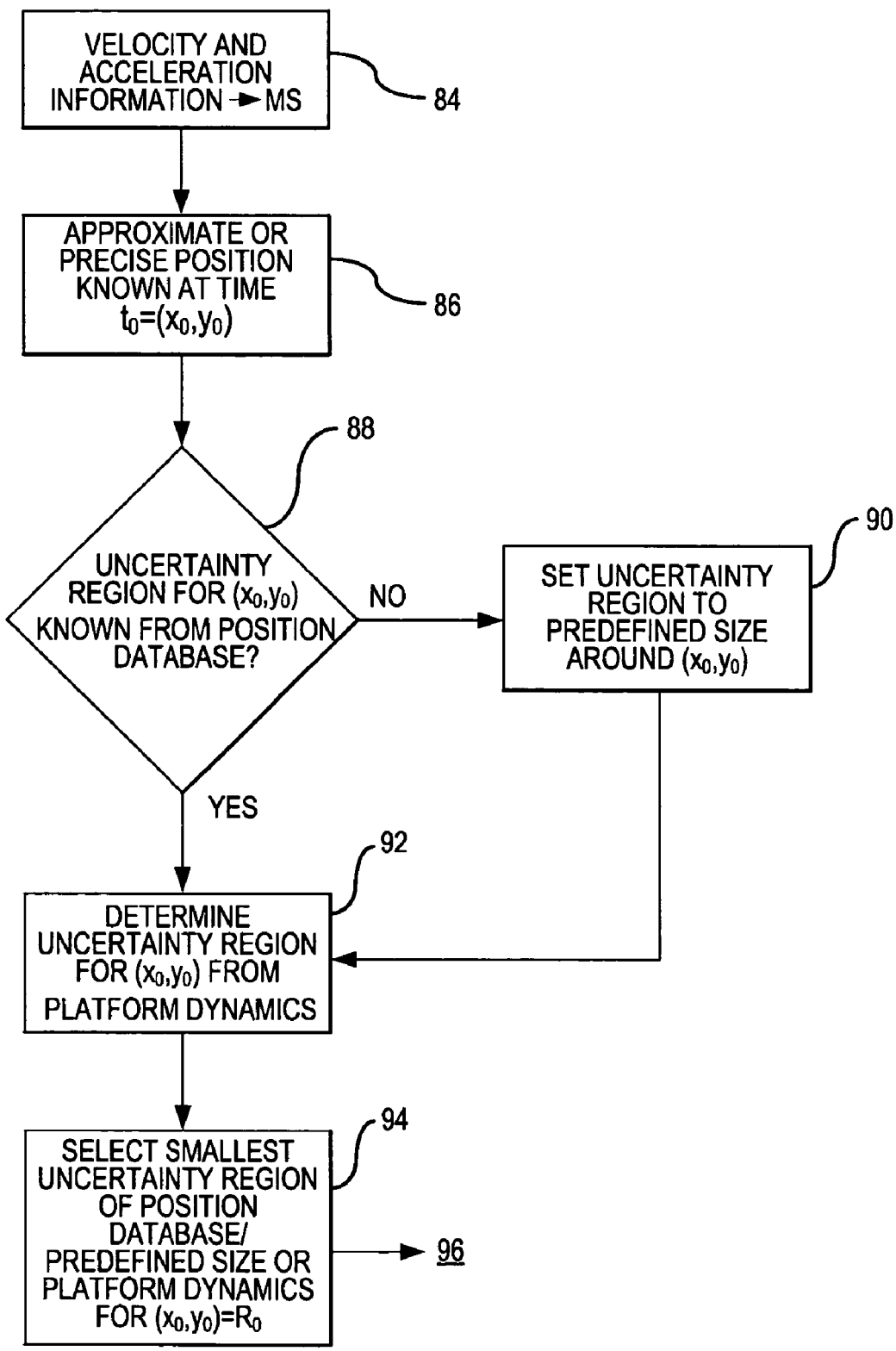
FIG. 5a illustrates an outline for a method of determining an uncertainty region based upon platform dynamics and the mobile station position database.

Referring to FIG. 5a, a diagram outlines a method for bounding the uncertainty region using the position database 42 and platform dynamics. While illustrative of this method, those of skill in the art will appreciate that several steps shown can be taken in different order to achieve the same result. Further, fewer or additional steps may be taken to achieve the same result. At the time of manufacture, velocity and acceleration information relevant to the MS are programmed into the MS 84. At time $(t_0)$, either an approximate position is known via the position database or a precise position is known based on SV signal acquisition, $(x_0, y_0)$ 86. At time $(t_1)$ position is requested by the MS. The MS accesses the position database to determine if an uncertainty region around $(x_0, y_0)$ is available 88. If not, the MS assigns an uncertainty region around $(x_0, y_0)$, such as, but not limited to, a circle of predefined radius with $(x_0, y_0)$ at the center 90. The MS also determines the uncertainty region around $(x_0, y_0)$ from platform dynamics 92. The MS then selects the smallest uncertainty region $(R_0)$ around $(x_0, y_0)$ derived by either platform dynamics, the position database, or the predefined size 94.

Figure 5B:
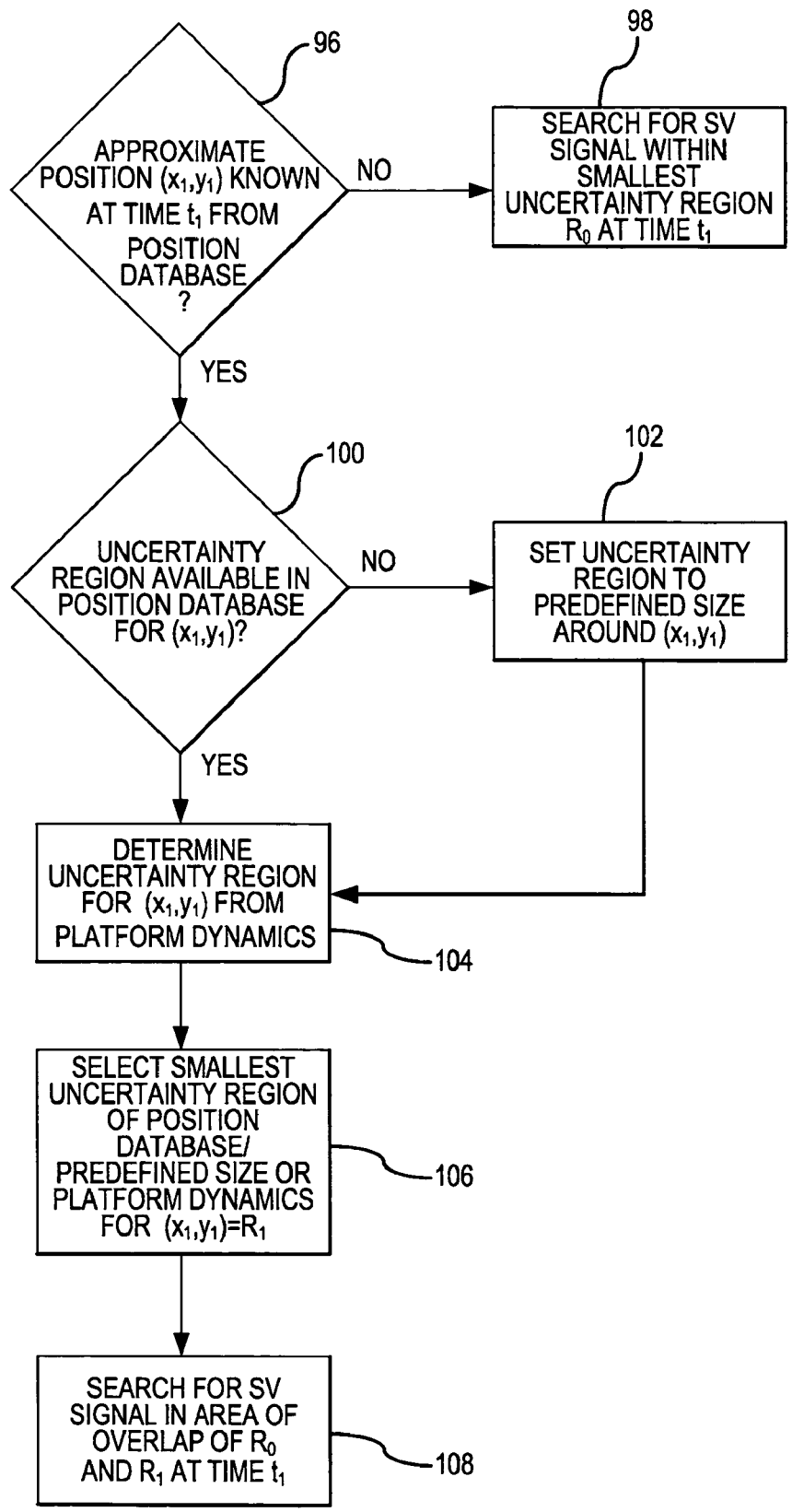

Continuing on to FIG. 5b, the MS also checks the position database at time $(t_1)$ for an approximate position $(x_1, y_1)$ 96. If approximate position $(x_1, y_1)$ is not available from the position database, then the SV is searched within the uncertainty region $(R_0)$ 98. If approximate position $(x_1, y_1)$ is available from the position database, then the MS checks for an uncertainty region associated with $(x_1, y_1)$ from the position database 100. If unavailable, the region is set to a predefined size 102. The MS also determines the uncertainty region around $(x_1, y_1)$ from platform dynamics 104. The smallest uncertainty region $(R_1)$ around $(x_1, y_1)$ derived by either platform dynamics, the position database, or predefined size is selected 106. Finally, the SV signal is initially searched within the area of overlap of $(R_0)$ and $(R_1)$ 108. If there is no area of overlap, the MS searches for the signal in region $(R_1)$. This methodology is performed by a suitable routine or routines operating in mobile control 38 (FIG. 2) or in communication with the mobile station.

In addition to providing SV signal acquisition assistance, the MS position database can be used for time maintenance. Time maintenance depends upon knowledge of SV positions, and is performed using almanac and ephemeris satellite orbit information. For example, although GSM and UMTS air interface protocols have asynchronous timing, accurate time can be determined by solving four equations in four unknowns as described above. Thus, if position is unknown, at least four SV signal propagation delay measurements are required to determine position. However, if position is known only the time variable remains, and only one measurement is required. Using approximate position data stored in the MS for a particular cell ID, time can be determined by measuring a single SV signal propagation delay. For example, if a MS was handed off to another cell, then only one SV measurement would be required to determine the correct time, given an approximate position. The approximate position need not be accurate in order to maintain accurate time to within +/−100 microseconds. The effect of MS movement on the time calculation is geometry-dependent. MS movement affects the delay measurement more if the SV is nearer to the horizon or at 0°, and less if the SV is directly above the MS, or at 90°. However, typically one kilometer of error in position is equivalent to approximately one microsecond of error in time. This methodology is performed by a suitable routine or routines operating in mobile control 38 (FIG. 2) or in communication with the mobile station.

The position database 42 can further be used as a "sanity check" on a position provided by SV signal measurement. Once a position is determined, it can be compared to positions previously located within the same cell ID and/or BSIC/PSC-frequency combination. Position determination can be affected by an errant measurement such as receiving an SV signal with a poor signal to noise ratio, picking up noise that appears to be an SV signal, multipath, interference, or other communication issues. The method herein optionally includes the step of comparing a position determination associated with a particular cell ID and/or BSIC/PSC-frequency combination to what is known by the position database. If a position location within a particular cell ID and/or BSIC/PSC-frequency combination falls far afield from previously sampled positions (e.g. see Table I), then the position is deemed faulty, or at least suspect. It will be appreciated by those of skill in the art that any number or type of comparisons between data in the position database and a position determination can be made to determine if a position is suspect or faulty. This methodology is performed by a suitable routine or routines operating in mobile control 38 (FIG. 2) or in communication with the mobile station.

In addition to time maintenance and performing "sanity checks" on positions determined by the MS by referring to the MS position database 42, the position database can be used for other purposes. The database can include data from geographical regions never before traveled. For example, a carrier for the MS may only operate in one country, e.g. the U.S., and the base station almanac used for assisted GPS would only function for that country as well. In the instance where the MS travels to a foreign country, such as South Africa, the MS would not be able to access the position database for approximate position because the local cell ID-BSIC/PSC-frequency combination could not exist in the position database; cell ID is unique throughout the world. The network and BSA would not be able to provide position location assistance either, because the MS is out of the country, and the United States BSA would not recognize the South African cell ID. In this type of situation the MS might only be able to determine position using autonomous modes of operation or by a UE Based method using a very large initial position uncertainty.

Returning to FIG. 3, the MS always adds unknown cell ID-BSIC/PSC-frequency combinations to the position database 55. Cell IDs of a unique country code, outside of the MS home network, indicate that the cell is in a foreign locale. An "out-of-network" database can be constructed by the network by associating position fix reports with the serving base station cell identifier. Once the MS has built an "out-of-network" position database, the information in that database could be transferred to a network given the messaging protocol of that network supported this type of information transfer. Thus an "out-of-network" database for that particular country exists not only in the MS but is provided to a carrier as well to form an "out-of-network" BSA. This methodology is performed by a suitable routine or routines operating in mobile control 38 (FIG. 2) or in communication with the mobile station.

The foregoing description illustrates exemplary implementations, and novel features, of a method and apparatus for a mobile cellular identification database for enhanced GPS performance. There are many aspects to this method and apparatus, because it may involve interaction between numerous components of a communications system. While some suggestions are provided for alternative uses and implementations of the method and apparatus, it is of course not practical to exhaustively list or describe such alternatives. Accordingly, the scope of the presented invention should be determined only by reference to the appended claims, and should not otherwise be limited by features illustrated herein except insofar as such limitation is recited in an appended claim.

While the above description has pointed out novel features of the disclosed method and apparatus, the skilled person will understand that various omissions, substitutions, and changes in the form and details of the method and apparatus illustrated may be made without departing from the scope of the invention. For example, the skilled person will be able to adapt the details described herein to communications systems having a wide range of modulation techniques, transmitter and receiver architectures, and generally any number of different formats. In particular, any system transmitter may function as a base station for purposes of this disclosure, and need not utilize UMTS, GSM or CDMA technology, nor even be a cellular telecommunications base station. Any transmitter may be treated similarly as SVs are treated herein, with acquisition assistance information deduced, obtained and employed to aid in the acquisition of a signal from such transmitter.

The method and apparatus uses the term "SV signal" for signals that are to be acquired or measured, because this is a common practice and is geometrically straightforward. However, any signal whose acquisition is sought may be treated as set forth for a "SV signal" of the set that is to be measured. All procedures for other signals that are to be measured, such as untracked BS signals, are substantially similar or identical to those referenced, such that the skilled person will readily modify the calculations for such other signals without a need for explicit instructions herein. Such other signals may serve many of the same purposes as SV signals, for example for ranging and location determination, and indeed may entirely supplant SV signals if necessary.

Each practical and novel combination of the elements described hereinabove, and each practical combination of equivalents to such elements, is contemplated as an embodiment of the invention. Partly because many more element combinations are contemplated as embodiments of the invention than can reasonably be explicitly enumerated herein, the scope of the invention is properly defined by the appended claims rather than by the foregoing description. Furthermore, any operable possible combination of features described above should be considered as having been expressly and explicitly disclosed herein. All variations coming within the meaning and range of equivalency of the various claim elements are embraced within the scope of the corresponding claim. To this end, each described element in each claim should be construed as broadly as possible, and moreover should be understood to encompass any equivalent to such element insofar as possible without also encompassing the prior art.

The invention claimed is:

1. A method for determining position of a mobile station, comprising:

storing a database of cellular identifications and associated position information in mobile station memory, wherein the position information is one or more previously determined positions of the mobile station;

searching for a satellite vehicle signal in an uncertainty region that is a function of the position information in the database; and assisting in mobile station position determination with the database.

2. The method of claim 1 wherein storing a database comprises:
storing at least one identifier selected from the group consisting of cell ID, BSIC identifier, PSC identifier, and base station carrier frequency; and
storing position information associated with the identifier.

3. The method of claim 1 wherein the uncertainty region comprises a region based upon position information associated with one identifier selected from the group consisting of cellular identification, BSIC identifier, PSC identifier, and base station carrier frequency.

4. The method of claim 1 wherein the uncertainty region comprises a region of predefined size.

5. The method of claim 1 wherein the uncertainty region comprises a region based upon assumed platform dynamics.

6. The method of claim 1 further comprising limiting the uncertainty region by selecting the smaller of an uncertainty region that is a function of position information in the database, an uncertainty region of predefined size, and an uncertainty region based upon assumed platform dynamics.

7. The method of claim 6 wherein assumed platform dynamics are based upon predefined velocity and acceleration information.

8. The method of claim 1 further comprising limiting the uncertainty region by selecting the smaller region ($R_0$) of an uncertainty region that is a function of position information stored in the database, an uncertainty region of predefined size, and an uncertainty region based upon assumed platform dynamics, for an initial position ($x_0$, $y_0$).

9. The method of claim 8 further comprising selecting the smaller region ($R_1$) of an uncertainty region that is a function of position information stored in the database, an uncertainty region of predefined size, and an uncertainty region based upon assumed platform dynamics, for a position ($x_1$, $y_1$).

10. The method of claim 9 further comprising searching for a satellite vehicle signal in the area of overlap of regions ($R_0$) and ($R_1$).

11. The method of claim 1 further comprising maintaining the database based upon updated mobile station position information.

12. The method of claim 11 wherein maintaining the database comprises recalculating position information based upon previous position information and current position information.

13. The method of claim 1 further comprising performing time maintenance for the mobile station based upon position information in the database.

14. The method of claim 13 wherein performing time maintenance comprises:
determining a position for the mobile station based upon position information in the database;
measuring a satellite vehicle signal propagation delay; and
determining time based upon the position and the satellite vehicle signal propagation delay.

15. The method of claim 1 further comprising performing a sanity check on a position determination based upon position information in the database.

16. The method of claim 2 further comprising storing an "out-of-network" database when the identifier and associated position information are located outside the mobile station home network.

17. The method of claim 16 further comprising transferring the "out-of-network" database to a network.

18. A method of determining mobile station position, comprising:
receiving at least one identifier selected from the group consisting of cell ID, BSIC identifier, PSC identifier, and base station carrier frequency, from a base station;
searching a position database stored in the mobile station for the identifier, wherein the position database includes at least one identifier and position information associated with the identifier, wherein the position information is one or more previously determined positions of the mobile station;
searching for a satellite vehicle signal based upon the position information from the position database; and
determining precise mobile station position based upon satellite vehicle signal acquisition.

19. The method of claim 18 further comprising storing precise mobile station position associated with the received identifier.

20. The method of claim 19 further comprising calculating an approximate position associated with the received identifier based upon precise mobile station position and at least one precise mobile station position determined earlier in time.

21. The method of claim 18 further comprising comparing the received identifier to identifiers stored in the position database to determine if the mobile station communicated with the base station at an earlier time.

22. The method of claim 21 further comprising adding the identifier to the position database in the event that the mobile station did not previously communicate with the base station.

23. The method of claim 22 further comprising storing position information associated with the identifier in the position database.

24. A mobile station apparatus comprising:
a two-way communication system;
a position location system;
mobile station control; and
memory comprising a position database comprising at least one identifier selected from the group consisting of cell ID, BSIC identifier, PSC identifier, and base station carrier frequency, and position information associated with the identifier, wherein the position information is one or more previously determined positions of the mobile station;
wherein the position location system, mobile control, and memory communicate such that a satellite vehicle signal is searched based upon the position information in the position database.

25. The mobile station of claim 24 wherein the position information comprises precise position information associated with the identifier for the mobile station at a particular time, and approximate position information for the identifier.

26. The mobile station of claim 25 wherein approximate position information is determined from the precise position information.

27. A mobile station apparatus comprising:
means for storing a database of cellular identifications and associated position information in mobile station memory, wherein the position information is one or more previously determined positions of the mobile station;
means for searching for a satellite vehicle signal in an uncertainty region that is a function of the position information in the database; and
means for assisting in mobile station position determination with the database.

28. A processor comprising:

memory comprising a position database comprising at least one identifier selected from the group consisting of cell ID, BSIC identifier, PSC identifier, and base station carrier frequency, and position information associated with the identifier, wherein the position information is one or more previously determined positions of a mobile station including a position location system and a mobile control;

wherein the memory communicate with the position location system and the mobile control such that a satellite vehicle signal is searched based upon the position information in the position database.

* * * * *